Feb. 10, 1931.    H. BANY    1,792,269
REGULATING SYSTEM
Filed June 17, 1929
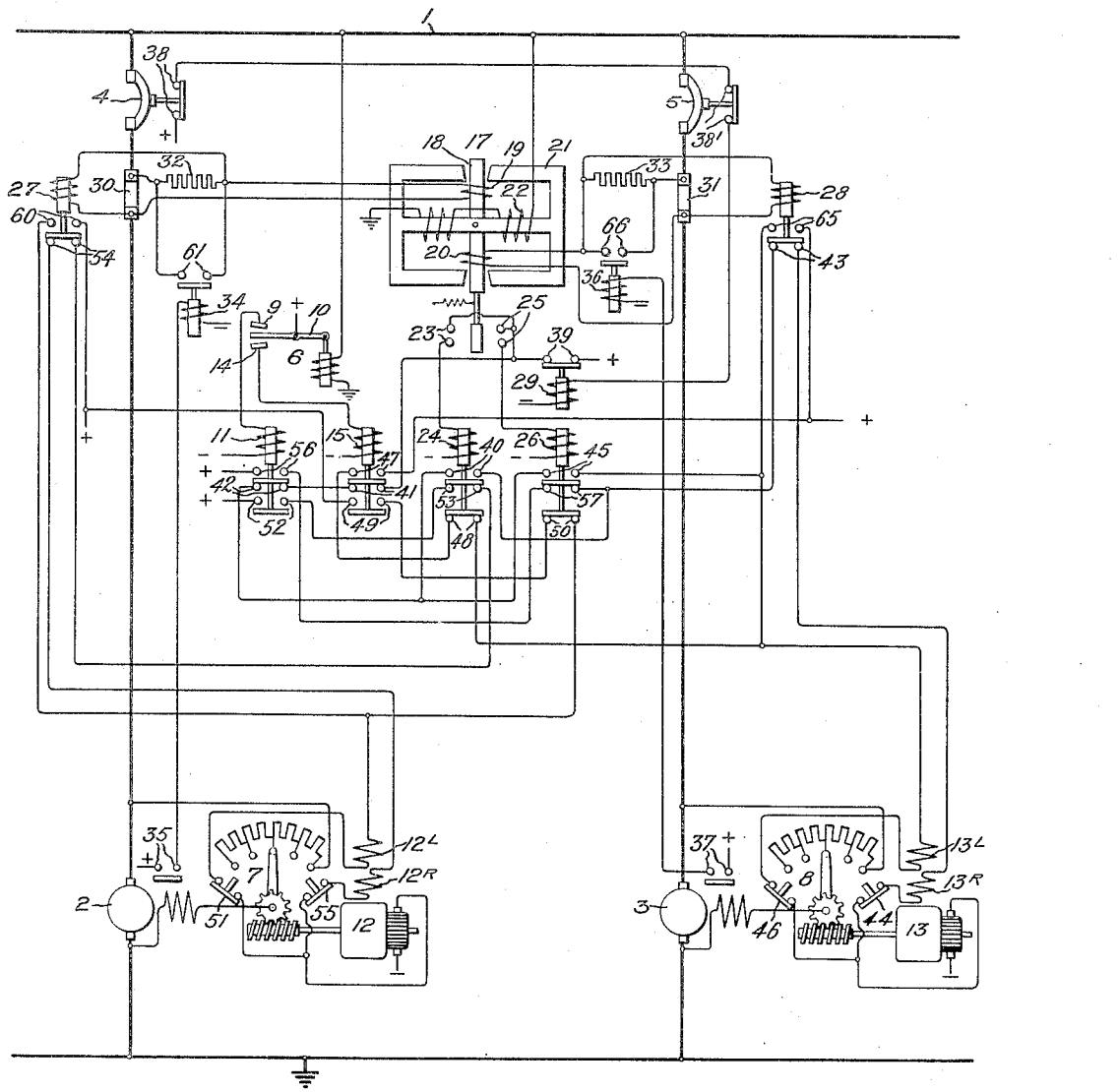
Inventor:
Herman Bany,
by Charles E. Tullar
His Attorney.

Patented Feb. 10, 1931

1,792,269

UNITED STATES PATENT OFFICE

HERMAN BANY, OF YEADON, PENNSYLVANIA, ASSIGNOR TO GENERAL ELECTRIC COMPANY, A CORPORATION OF NEW YORK

REGULATING SYSTEM

Application filed June 17, 1929. Serial No. 371,662.

My invention relates to regulating systems and particularly to systems for maintaining a predetermined relation between the currents flowing through a plurality of parallel connected translating devices such as two parallel connected sources of current.

In multiple unit substations it is usually desirable to maintain the load divided between the units, which are in service, so that they all carry the same percentage of their full load capacity. For example if there are two units in service and they have the same capacity, the load is divided equally between them whereas if one of the units has double the capacity of the other, the load is divided between them so that the larger unit carries two-thirds of the total load and the smaller unit carries only one-third of the total load.

In such multiple unit substations, each unit is sometimes provided with means for limiting the amount of current flowing through it, after the current through it has exceeded a predetermined amount for a predetermined time, because the safe operating capacity of an overheated unit is less than the safe operating capacity of the same unit when cold. When a cold unit is first connected in parallel with a unit, which has been carrying an excessive load so that the safe operating capacity thereof has been decreased, it is desirable to have the cold unit supply more than its normal share of the total load so that the safe operating capacity of the hot unit may be restored to its normal value as soon as possible and one object of my invention is to provide an arrangement for accomplishing this result. In accordance with my invention, I provide an arrangement for controlling the division of load between a plurality of units so that under certain conditions of the units a certain division of load is maintained between the units and under other conditions of the units a different division of load is maintained between the units.

My invention will be better understood from the following description taken in connection with the accompanying drawing and its scope will be pointed out in the appended claims.

Referring to the accompanying drawing which shows diagrammatically an electric system embodying my invention, 1 represents an electric circuit which is arranged to be supplied by a plurality of sources of current which may be of any suitable type. As shown in the drawing, the circuit 1 is a direct current load circuit and two direct current machines 2 and 3 are connected in parallel across the load circuit 1. In order to simplify the disclosure it will be assumed that the machines 2 and 3 operate only as generators but it is obvious that my invention is applicable to systems in which the machines 2 and 3 may also operate under certain conditions as motors, supplied with current from the load circuit 1.

The machine 2 is arranged to be connected to the load circuit 1 by means of a circuit breaker 4 and the machine 3 is arranged to be connected to the load circuit 1 by means of a circuit breaker 5. These circuit breakers may be of any suitable type examples of which are well known in the art and so far as the present invention is concerned may be either manually or automatically controlled. In order to simplify the disclosure it is assumed that they are manually controlled but in actual practice they may be a part of an automatic switching equipment for automatically connecting the respective machines to the circuit 1 at the proper time. Examples of such automatic switching equipments are old and well known in the art.

When the machines 2 and 3 are connected across the load circuit 1, it may be desirable to control the machines so as to maintain constant some predetermined electrical condition of the machines, or load circuit, such for example as the voltage at some point on circuit 1. For accomplishing this result a suitable control device, such as a contact making voltmeter 6, may be provided which is connected so that it is energized in accordance with the voltage which it is desired to maintain. This voltmeter 6 is arranged to control suitable regulating control circuits associated with each generator so that when the load circuit voltage varies from normal the voltmeter effects a change in the excitation of one or both of the machines so as to restore the load circuit voltage to normal. As shown in the drawing, the voltmeter 6 controls the motor operated rheostats 7 and 8 connected respectively in the shunt field circuits of the machines 2 and 3. When the voltage of the load circuit 1 is below a predetermined value so that contacts 9 and 10 of the voltmeter 6 are closed, a circuit for a control relay 11 associated with the voltmeter 6 is completed. When the control relay 11 is energized and a predetermined relation exists between the currents flowing through the machines 2 and 3, raising circuits are completed for the motors 12 and 13 of rheostats 7 and 8 respectively to effect an increase in the excitation of both of the machines 2 and 3.

When the voltage of the circuit 1 is above a predetermined value so that contacts 10 and 14 of the contact making voltmeter 6 are closed, a circuit for a control relay 15 is completed. The control relay 15 is so arranged that when it is energized and a predetermined relation exists between the currents flowing through the two machines, lowering circuits are simultaneously completed for the motors 12 and 13 of rheostats 7 and 8 respectively, so as to decrease the excitation of the machines 2 and 3.

In order that a predetermined current division may normally be maintained between the machines when they are supplying current to the circuit 1, I provide a differential relay 17 which may be of any suitable type, examples of which are well known in the art, for electrically controlling the operation of the rheostats 7 and 8. As shown in the drawing, the differential relay 17 is a polarized relay comprising an armature 18 energized by two windings 19 and 20 which are wound differentially with respect to each other and which are respectively connected in any suitable manner so as to be energized in accordance with the magnitude of the currents flowing through the machines 2 and 3 respectively. The armature 18 is pivoted between the polar projections of a stationary magnetic member 21 so that it occupies different positions, depending upon the direction of the resultant magnetomotive force produced by the currents through the windings 19 and 20. The magnetic member 21 may be a permanent magnet but preferably it is magnetized by means of a magnetizing winding 22 which is connected to a suitable source of current such as the load circuit 1. The armature 18 is arranged so that it occupies the position shown in the drawing when the ampere turns of the two windings 19 and 20 are substantially equal. When current is flowing from the machines 2 and 3 to the load circuit 1 and the ampere turns of the winding 19 exceed the ampere turns of the winding 20 the direction of the resultant flux in the armature 18 is such that the armature 18 is moved to the left and closes the contacts 23 to effect the energization of control relay 24. When the machines 2 and 3 are supplying current to the circuit 1 and the ampere turns of the winding 20 exceed the ampere turns of the winding 19, the direction of flux in the armature 18 is such that the armature 18 is moved to the right and closes the contacts 25 in the circuit of the control relay 26. Therefore, it would be observed that the control relay 24 is energized whenever the machine 2 is supplying more than its normal portion of the total load supplied by machines 2 and 3 and that the control relay 26 is energized whenever the machine 3 is supplying more than its normal portion of the total current.

For the purposes of this description it will be assumed that the capacities of the two sources 2 and 3 are equal so that the current differential relay 17 operates whenever the currents through the two machines 2 and 3 are unequal. It is to be understood, however, that my invention is not limited to such an arrangement, as the relay 17 may be arranged normally to maintain any desired ratio between the currents flowing through the two sources.

As will be more fully described in connection with the operation of the arrangement shown in the drawing, the control relays 24 and 26 control the raising and lowering circuits of the motor operated rheostats 7 and 8 respectively, so as to maintain the proper division of the current between the two machines.

In order to render the current balance relay 17 inoperative to modify the regulation of one of the machines 2 and 3 when it is the only one in service, I provide a relay 29 which is so connected that it is energized only when both of the machines 2 and 3 are connected to the load circuit 1. The relay 29 controls the circuits of the control relays 24 and 26 associated with the current balance relay 17 so that these control relays are energized to control the operation of the motor operated rheostats 7 and 8 only when both machines are in service. When only one machine is in service, its motor operated rheostat is controlled in accordance with the voltage of the load circuit and the current flowing through the machine in service.

In order to limit the current flowing through each machine to a predetermined value the machines 2 and 3 are provided with the current responsive relays 27 and 28 respectively. These relays are connected in any suitable manner so that each is responsive to the amount of current flowing through the respective machine. These relays are also arranged in such a manner that they control the operation of the motor operated rheostat of the associated source independently of the voltmeter 6 so that the current output of the associated source is maintained below a predetermined value.

The value of current output, which the relays 27 and 28 are normally arranged to maintain, is usually higher than the safe operating value at which the sources can operate indefinitely without becoming overheated. Therefore, if a source remains connected to an abnormal load long enough so that it becomes overheated, it is desirable to reduce the current output of the overheated source to a value which will allow the temperature of the overheated source to decrease to a safe operating value. In the arrangement shown in the drawing this result is obtained by respectively connecting the windings of the relays 27 and 28 in shunt circuits around suitable impedance means such as resistance shunts 30 and 31 in series with the sources 2 and 3 and providing respectively in the shunt circuits including the windings of relays 27 and 28, the resistors 32 and 33 which are arranged to be short circuited when the temperature of the associated source exceeds a predetermined value. For short circuiting the resistor 32 a control relay 34 is provided, the energization of which is controlled by means of a suitable device which is arranged to close the contact 35 in accordance with the temperature of the source 2. For short circuiting the resistor 33, a control relay 36 is provided, the energization of which is controlled by means of a suitable device which is arranged to close the contact 37 in accordance with the temperature of the source 3. The devices for controlling the contacts 35 and 37 may be of any suitable type examples of which are well known in the art. For example they may be thermal responsive devices such as contact making thermometers, which are placed in thermal relation with certain parts of the respective machines or they may be suitable thermal or current relays, which are controlled by the amount of current being supplied by the respective sources so that their operations vary in accordance with the current carrying capacities of the respective sources. It will be observed that whenever a predetermined abnormal current condition occurs which reduces the current carrying capacity of a source the relation between the impedances of the associated series connected impedance means and the circuit of the associated current regulating relay is varied so that current regulating relay operates to maintain the current output of the source constant at a lower value.

In order to decrease the portion of total load which an overheated machine carries when it is operating in parallel with a machine which is not overheated the current coils 19 and 20 of the current differential relay 17 are also normally connected in series respectively with the resistors 32 and 33 across the shunts 30 and 31. Therefore, whenever both machines are in service and either the resistor 32 or the resistor 33 is short circuited, the relay 17 operates to maintain a different division of load between the two machines than it does when neither the resistor 32 nor the resistor 33 is short circuited.

The operation of the arrangement shown in the drawing is as follows:

When both of the machines 2 and 3 are connected to the load circuit, the load circuit voltage is normal and the current outputs of the two machines are balanced and below predetermined values, the various control devices are in the positions shown in the drawing. The control relay 29 is energized as its circuit is completed through the auxiliary contacts 38 on the circuit breaker 4 and the auxiliary contacts 38' on the circuit breaker 5. The raising and lowering circuits of the two motor operated rheostats are not completed as the load circuit voltage is normal and the desired current relation exists between the two machines.

When the load circuit voltage is normal, both of the control relays 11 and 15 are deenergized. When the current output of the machine 2 is normal but exceeds the current output of the machine 3 by more than a predetermined amount, the current balance relay 17 closes its contacts 23 and completes the circuit of the control relay 24. The circuit of the control relay 24 also includes the contacts 39 of the control relays 29. Control relay 24 by closing its contacts 40 completes the raising circuit for the motor operated rheostat 8 associated with the machine 3. This raising circuit is from one side of a suitable control circuit through the contacts 39 of the energized control relay 29, contacts 41 of the deenergized control relay 15, contacts 42 of the deenergized control relay 11, contacts 40 of the energized control relay 24, contacts 43 of current relay 28, field winding 13R of the motor 13, limit switch 44 on the rheostat 8, armature of motor 13 to the other side of the control circuit. When the raising circuit is completed the motor 13 operates and adjusts the rheostat 8 so as to increase the excitation of machine 3 and thereby increase the current output of machine 3, so as to restore the normal current division between the two machines.

When the load circuit voltage is normal and the current output of the machine 3 is normal but exceeds the current output of the machine 2 by more than a predetermined amount, the current balance relay 17 closes its contacts 25 and completes an energizing circuit for the control relay 26. The circuit of the control relay also includes contacts 39 of the energized control relay 29. The control relay 26 by closing its contacts 45 completes a lowering circuit for the motor 13 of the motor operated rheostat 8 so as to decrease the excitation and current output of machine 3 and thereby restore the normal division of the current between the two machines. The lowering circuit for the motor 13 is from one side of the control circuit through contacts 39 of the energized control relay 29, contacts 41 of the deenergized control relay 15, contacts 42 of the deenergized control relay 11, contacts 45 of the energized control relay 26, field winding 13L of the motor 13, limit switch 46 on the rheostat 8, and the armature of motor 13 to the other side of the control circuit.

When the voltage of the load circuit 1 is above a predetermined value so that the contacts 10 and 14 of the contact making voltmeter 6 are closed and the control relay 15 is energized and the current outputs of machines 2 and 3 are normal and equal so that both of the control relays 24 and 26 are deenergized, a lowering circuit is completed for each of the motor operated rheostats to decrease the excitation of both machines. The lowering circuit for the motor 13 is from one side of the control circuit through the contact 47 of the energized control relay 15, contact 48 of the deenergized control relay 24, field winding 13L of the motor 13, limit switch 46, armature of motor 13 to the other side of the control circuit. The lowering circuit for motor 12 is from one side of the control circuit through contacts 49 of the energized control relay 15, contact 50 of the deenergized control relay 26, field winding 12L of the motor 12, limit switch 51, armature of the motor 12 to the other side of the control circuit. Therefore, when the load circuit voltage is high and the current outputs of the two machines are normal and equal the excitations of both machines are simultaneously decreased to restore the load circuit voltage to its normal value.

When the load circuit voltage is above a predetermined value so that the control relay 15 is energized and the current output of machine 2 is normal but exceeds the current output of machine 3 by more than a predetermined amount so that the control relay 24 is energized, the lowering circuit, traced in the preceding paragraph, for the rheostat 7 is completed but the lowering circuit for the rheostat 8, traced in the preceding paragraph, is not completed because this lowering circuit is opened at the contacts 48 of the energized control relay 24. Therefore, it will be observed that when the load circuit voltage is above normal and the current output of machine 2 is normal but exceeds the current output of machine 3, only the excitation of the machine 2, which is carrying more than its share of the load, is varied.

When the load circuit voltage is above a predetermined value and the current output of machine 3 is normal but exceeds the output of machine 2 by more than a predetermined amount, so that the control relay 26 is energized, the lowering circuit traced above for the motor operated rheostat 8 is completed but the lowering circuit for the motor operated rheostat 7 traced in a preceding paragraph, is not completed because this lowering circuit is opened at contacts 50 of the energized relay 26. Therefore, when the load circuit voltage is above normal, and the current output of machine 3 is normal but exceeds the current output of machine 2, only the excitation of machine 3 which is supplying more than its share of the load is decreased to restore the load circuit voltage to normal and the desired division of current between the two machines.

When the load circuit voltage is below a predetermined value so that the control relay 11 is energized and the output currents of machines 2 and 3 are normal and equal so that both of the control relays 24 and 26 are deenergized, the raising circuits for both of the motor operated rheostats 7 and 8 are simultaneously completed to increase the excitations of both machines. The raising circuit for the motor operated rheostat 7 is from one side of the control circuit through contacts 52 of the energized control relay 11, contacts 53 of the deenergized control relay 24, contacts 54 of the current relay 27, field winding 12R of motor 12, limit switch 55 of the rheostat 7, armature of motor 12 to the other side of the control circuit. The raising circuit for the motor operated rheostat 8 is from one side of the control circuit through contacts 56 of the energized control relay 11, contacts 57 of the deenergized control relay 26, contacts 43 of the current relay 28, field winding 13R of motor 13, limit switch 44 of the rheostat 8, armature of the motor 13 to the other side of the control circuit. Therefore, when the load circuit voltage is below normal and the output currents of the two machines are normal and equal the excitations of both machines are simultaneously increased to restore the load circuit voltage to normal.

When the load circuit voltage is below a predetermined value so that the control relay 11 is energized and the current output of machine 2 is normal but exceeds the current output of machine 3 by more than a predetermined amount so that the control relay 24 is energized, the raising circuit for the rheostat 8, traced in the preceding paragraph, is completed through contact 43 of relay 28, contacts 57 of deenergized control relay 26 and contact 56 of energized control relay 11, to increase the excitation of machine 3. The raising circuit for the motor operated rheostat 7 traced in the preceding paragraph, however, is open at contacts 53 of the energized control relay 24. Therefore, when the load circuit voltage is below normal and machine 2 is supplying more current than the machine 3, the excitation of machine 3, which is supplying less than its share of the load is increased to restore the load circuit voltage to normal and to restore the normal balance between the currents through the two machines.

When the load circuit voltage is below a predetermined value so that control relay 11 is energized and the current output of machine 3 is normal but exceeds the current output of machine 2 by more than a predetermined amount so that control relay 26 is energized, the above traced raising circuit for rheostat 7 through contact 54 of relay 27, contact 53 of deenergized control relay 24 and contacts 52 of the energized control relay 11 is completed to increase the excitation of machine 2. The above traced raising circuit for rheostat 8, however, is not completed as this raising circuit is open at contact 57 of the energized control relay 26. Therefore, when the load circuit voltage is below normal and the current output of machine 3 is normal but exceeds the current output of machine 2 only the excitation of machine 2, which is supplying less than its share of the load is increased to restore the load circuit voltage to normal and the desired balance between the currents flowing through the two machines.

In the description given heretofore of the operation it has been assumed that both of the sources 2 and 3 are not overheated and that the current outputs of the sources 2 and 3 are respectively below the values required to cause the relays 27 and 28 to open their respective contacts 54 and 43.

If at any time the current output of machine 2 exceeds a predetermined value, the current relay 27 effects the opening of its contacts 54 and the closing of its contact 60. Relay 27 by opening its contact 54 interrupts the raising circuit for the rheostat 7 so that the contact making voltmeter 6 and current balance relay 17 cannot effect the operation of the rheostat 7 to increase the excitation of the machine 2. The relay 27 by closing its contact 60 completes a lowering circuit for the rheostat 7. This circuit is from one side of the control circuit through contacts 60 of the current relay 27, field winding 12L of the motor 12, limit switch 51 of the rheostat 7, armature of motor 12 to the other side of the control circuit. This lowering circuit remains closed until the output of the machine 2 is decreased sufficiently to permit relay 27 to open its contacts 60.

If the source 2 continues to supply the abnormal current for a sufficient length of time to effect the closing of the contacts 35 associated therewith, the control relay 34 is energized and by closing its contacts 61 short circuits the resistor 32 in the circuit of the coil of relay 27 and the coil 19 of relay 17. Since the short circuiting of the resistor 32 decreases the resistance of the shunt circuit around the shunt 30 relatively to the resistance of the shunt, it requires less current through the source 2 to effect the operation of the relay 27. Therefore, as long as the contacts 35 remain closed, the relay 27 is arranged to maintain the current output of the source 2 below a lower value than when the contacts 35 are open.

Also, when the resistor 32 is short circuited a greater portion of the total current output of the source 2 flows through the winding 19 of the current differential relay 17 than when the resistor 32 is not short circuited. Therefore, it will be observed that when the resistor 32 is short circuited and the resistor 33 is not short circuited, the current output of the source 2 required to make the ampere turns of the winding 19 equal to the ampere turns of the winding 20 is less than when the resistor 32 is not short circuited. Consequently, the relay 17 operates to maintain a smaller portion of the total load on the source 2 when the source 2 is overheated than when it is operating under normal conditions.

The current relay 28, associated with machine 3 is arranged in a similar manner to limit the amount of current flowing through the machine 3 when the output of the machine 3 exceeds a predetermined value. Whenever the current flowing through the machine 3 exceeds a predetermined value, relay 28 opens its contact 43 in the raising circuit for rheostat 8. When the current exceeds a slightly higher predetermined value the relay 28 closes its contact 65 so as to complete a lowering circuit for the rheostat 8. Whenever the current output of the source 3 remains at an abnormal value for a sufficient length of time to effect the closing of the contacts 37 associated therewith, the control relay 36 is energized and by closing its contacts 66 short circuits the resistor 33 so that the relay 28 maintains the current output of the source 3 below a lower predetermined value than it normally does and the current differential relay 17 operates to maintain a smaller portion of the total load on the source 3 than is normally carried thereby when operating in parallel with the source 2.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, two parallel connected sources, and means responsive to predetermined conditions of said sources for maintaining a predetermined division of load between said sources under certain electric conditions of said machines and for maintaining a different predetermined division of load between said sources under certain other conditions of said sources.

2. In combination, two parallel connected dynamo electric machines, regulating means normally arranged to maintain a predetermined division of load between said machines, and means responsive to a predetermined abnormal condition of one of said machines to cause said regulating means to maintain a different predetermined division of load between said machines.

3. In combination, a plurality of parallel connected electric translating devices, regulating means normally arranged to maintain a predetermined relation between the currents through said devices, and means responsive to a predetermined abnormal condition of one of said devices for causing said regulating means to maintain a different predetermined relation between the currents through said devices.

4. In combination, two parallel connected sources of current, regulating means responsive to the relative currents flowing through said sources for maintaining a predetermined relation between the two currents, and means responsive to a predetermined current condition of one of said sources for causing said regulating means to maintain a different predetermined relation between the currents flowing through said sources.

5. In combination, two parallel connected sources of current, regulating means responsive to the relative currents flowing through said sources for maintaining a predetermined relation between the two currents, and means responsive to a predetermined current condition of one of said sources for controlling the operation of said regulating means so that the portion of the load it maintains on said one of said sources is decreased relatively to the portion of the load it maintains on the other source.

6. In combination, two parallel connected translating devices, regulating means for controlling the relative currents through said devices including an electroresponsive device having two cooperating windings respectively connected so as to be energized in response to the currents through said devices, and means responsive to a predetermined abnormal condition of one of said devices for varying the relation between the current in one of said windings and the current through the respective device.

7. In combination, two parallel connected dynamo electric machines, regulating means for controlling the relative currents through said machines including a differential relay having two cooperating windings respectively connected so as to be energized in response to the currents through said machines, and means responsive to a predetermined abnormal current condition of one of said machines for varying the relation between the current in one of said windings and the current through the respective machine.

8. In combination, two parallel connected sources of current, impedance means connected in series with each source, regulating means for controlling the relative currents through said sources including a differential relay having two cooperating windings respectively connected in shunt circuits across said impedance means, and means responsive to a predetermined abnormal condition of one of said sources for varying the impedance of one of said shunt circuits.

9. In combination, two parallel connected sources of current, impedance means connected in series with each source, regulating means for controlling the relative currents through said sources including a differential relay having two cooperating windings respectively connected in shunt across said impedance means, current limiting means connected in series with each of said windings, and means responsive to a predetermined abnormal circuit condition of one of said sources for decreasing the amount of current limiting means in series with the associated relay winding.

10. In combination, two parallel connected dynamo electric machines, impedance means connected in series with each machine, regulating means for controlling the relative currents through said machines including a differential relay having two cooperating windings respectively connected in shunt circuits around said impedance means, and means responsive to a predetermined abnormal condition of one of said machines for varying the relative impedances of one of said impedance means and the shunt circuit around it.

11. In combination, an electric translating device, regulating means for controlling the current through said device including impedance means connected in series with said device and a relay having a winding connected in shunt with said impedance means, and means responsive to a predetermined abnormal condition of said device for varying the relative impedances of said shunt circuit and said impedance means.

12. In combination, a source of current, regulating means for controlling the current output of said source including impedance means connected in series with said source and a relay winding connected in shunt with said impedance means, a resistor in series with said winding and in shunt with said impedance means, and means responsive to a predetermined abnormal current condition of said source for short circuiting said resistor.

13. In combination, a dynamo electric machine, regulating means for controlling the current through said machine including impedance means connected in series with said machine and a relay having a winding connected in a shunt circuit around said impedance means, and means responsive to a predetermined abnormal current condition of said machine for varying the impedance of said shunt circuit relatively to the impedance of said impedance means.

In witness whereof, I have hereunto set my hand this tenth day of June, 1929.

HERMAN BANY.